Patented May 4, 1937

2,079,312

UNITED STATES PATENT OFFICE 2,079,312

PROCESS OF PRODUCING A NOVEL 8-HYDROXYQUINOLINE SALT

Friedrich Boedecker, Dahlem, near Berlin, Germany, assignor to Chinosolfabrik Aktiengesellschaft, Hamburg-Billbrook No Drawing. Application November 27, 1933, Serial No. 700,017. In Germany December 9, 1932

8 Claims. (Cl. 260—41)

The present invention relates to a process of producing a novel, water-soluble derivative of the 8-hydroxyquinoline.

As is known, the 8-hydroxyquinoline reacts with acid salts of sulfuric acid under formation of salts. These salts, which are frequently used in the practice, are produced by bringing together aqueous solutions of for instance potassium bisulfite with an alcoholic solution of 8-hydroxyquinoline. It is not possible to carry through the reaction without alcohol, because always a mixture of 8-hydroxyquinoline sulfate and potassium sulfate is obtained when attempts are made to gain the reaction product by crystallization or to separate it from the starting material. This is of course felt as a serious drawback since the use of alcohol enhances the process.

It has now been found, that the use of alcohol can be dispensed with if instead of an acid salt of the sulfuric acid the acid sodium salt of the 5-sulfosalicylic acid is used. If for instance 8-hydroxyquinoline is added to a solution of the acid sodium salt of the 5-sulfosalicylic acid which has a temperature of about 80–90° C. or if 5-sulfosalicylic acid is added to an aqueous solution of 8-hydroxyquinoline at first a solution is obtained and when this solution is cooled or allowed to cool the corresponding 8-hydroxyquinoline salt will separate out in the form of well-shaped crystals. The same result is attained when the 8-hydroxyquinoline salt of the primary sodium-sulfosalicylate is produced after other known methods and the treatment is carried out in the heat and in a solution of such concentration, that the novel salt will separate out when the solution is cooled. If for instance a mixture of 1 molecule of 8-hydroxyquinoline and 1 molecule of 5-sulfosalicylic acid or the primary sulfosalicylic acid salt of the 8-hydroxyquinoline is treated with 1 molecule of caustic soda or ½ molecule of soda in the presence of a small amount of water the above named product will also be obtained when the mass is cooled.

The result of the described process is very surprising, particularly when considering, that neither the producing of potassium 8-hydroxyquinoline sulfate nor the process described above will succeed when the acid potassium salt of the 5-sulfosalicylic acid is used. When working with the acid potassium salt of the 5-sulfosalicylic acid the desired salt will not separate out at all, neither in an aqueous solution nor after addition of alcohol. The novel salt is characterized by an excellent disinfecting effect. The aqueous solutions of the salt are stable.

Example.—21,8 parts of 5-sulfosalicylic acid are dissolved in 5,3 parts of soda and 25 parts of water under heating to 80–90° C. 13,5 parts of 8-hydroxyquinoline are added and the mixture is stirred until a clear yellow-red solution is formed. When allowed to cool the entire mass will solidify to a homogeneous yellow crystal mass. The double salt is obtained by sucking off the moisture or by drying the crystal pap directly at 30° C. The product is a lemon-colored crystal powder which dissolves easily and quickly in water and gives a solution of yellow color.

I claim:—

1. A process of producing a novel water-soluble salt of the 8-hydroxyquinoline, comprising converting 8-hydroxyquinoline and 5-sulfosalicylic acid in aqueous solution and in the presence of 1 atom of Na into the 8-hydroxyquinoline salt of the primary sodium-sulfosalicylic acid and separating out the salt.

2. A process of producing a water-soluble salt of the 8-hydroxyquinoline, comprising dissolving 8-hydroxyquinoline together with primary sodium 5-sulfosalicylate in water and separating out the salt.

3. A process of producing a novel water-soluble salt of the 8-hydroxyquinoline, comprising causing 8-hydroxyquinoline to act upon 5-sulfosalicylic acid in aqueous solution in the presence of caustic soda lye and separating out the salt.

4. A process of producing a novel water-soluble salt of the 8-hydroxyquinoline, comprising causing 8-hydroxyquinoline to act upon 5-sulfosalicylic acid in aqueous solution in the presence of soda and separating out the salt.

5. A process of producing a novel water-soluble salt of the 8-hydroxyquinoline, comprising treating the primary 5-sulfosalicylic acid salt of the 8-hydroxyquinoline in aqueous solution with caustic soda lye and separating out the reaction product.

6. A process of producing a novel water-soluble salt of the 8-hydroxyquinoline, comprising treating the primary 5-sulfosalicylic acid salt of the 8-hydroxyquinoline in aqueous solution with soda and separating out the reaction product.

7. A process of producing a novel water-soluble salt of the 8-hydroxyquinoline, comprising converting 8-hydroxyquinoline and 5-sulfosalicylic acid in aqueous solution and in the presence of 1 atom of Na into the 8-hydroxyquinoline salt of the primary sodium-sulfosalicylic acid at raised temperature, hereby using a solution of such concentration, that the salt will separate out on cooling.

8. As a commercial product, the 8-hydroxyquinoline salt of the primary sodium 5-sulfosalicylic acid.

FRIEDRICH BOEDECKER.